| United States Patent | [15] | 3,649,223 |
|---|---|---|
| Murib | [45] | Mar. 14, 1972 |

[54] PROCESS FOR RECOVERY OF SOLUBLE ALKALI METAL HYDRIDES FROM INSOLUBLE ALKALI METAL ALUMINUM HEXAHYDRIDES

[72] Inventor: Jawad H. Murib, Cincinnati, Ohio

[73] Assignee: National Distillers and Chemical Corporation, New York, N.Y.

[22] Filed: Aug. 7, 1968

[21] Appl. No.: 750,742

[52] U.S. Cl.................................................23/365, 23/204
[51] Int. Cl......................C01b 6/24, C01b 6/32, C01b 6/04
[58] Field of Search...........................................23/365, 204

[56] References Cited

UNITED STATES PATENTS 3,355,262  11/1967  Beaird, Jr. et al.........................23/365

*Primary Examiner*—M. Weissman
*Attorney*—Allen A. Meyer, Jr.

[57] ABSTRACT

A process is provided for recovering soluble alkali metal hydride values from insoluble alkali metal aluminum hexahydrides, in the form of the soluble alkali metal aluminum tetrahydrides, by reaction with an oxygen ether. The formation of the tetrahydride is accompanied by liberation of alkali metal hydride, as a valuable product.

10 Claims, No Drawings

PROCESS FOR RECOVERY OF SOLUBLE ALKALI METAL HYDRIDES FROM INSOLUBLE ALKALI METAL ALUMINUM HEXAHYDRIDES

This invention relates to a process for the recovery of soluble alkali metal hydride values, as alkali metal aluminum tetrahydrides, such as $LiAlH_4$ and $NaAlH_4$, from the insoluble alkali metal aluminum hexahydrides, such as $Li_3AlH_6$ and $Na_3AlH_6$, and more particularly to a process for converting insoluble alkali metal aluminum hexahydrides to the corresponding tetrahydrides by reaction with an oxygen ether, with liberation of alkali metal hydride as a byproduct.

Alkali metal aluminum hexahydrides have been encountered as byproducts in certain reactions involving alkali metal aluminum tetrahydrides. For example, F.M. Peters, *Canadian Journal of Chemistry*, 42, 1755 (1964), shows the preparation of bis-trimethylamine alane $AlH_3:2NMe_3$ from the reaction of lithium aluminum tetrahydride and trimethylamine with the formation of insoluble $Li_3AlH_6$ as a byproduct:

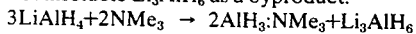
$$3LiAlH_4 + 2NMe_3 \rightarrow 2AlH_3:NMe_3 + Li_3AlH_6$$

In this reaction, 50 percent of the soluble hydride values ($LiAlH_4$) were rendered insoluble ($Li_3AlH_6$) and hence useless as reducing agent. The hexahydride byproduct has been shown to be completely insoluble in solvents suitable for hydride reduction, as reported by Ehrlich, *J. Amer. Chem. Soc.* 88 858 (1966), and by Ashby, *Inorg. Chem.* 5, 1615, (1966).

Accordingly, a convenient recovery of the soluble hydride values from the insoluble hexahydrides would be desirable. Ashby describes the conversion of the hexahydride to the tetrahydride by reaction with aluminum and hydrogen under superatmospheric pressure and high temperature in the presence of aluminum alkyl catalyst:

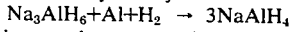
$$Na_3AlH_6 + Al + H_2 \rightarrow 3NaAlH_4$$

This, however, is a cumbersome and costly procedure to carry out, especially on a large scale. Such a process is not very attractive for commercial application because of the high temperatures required, and because of the need as reactants for hydrogen under high pressure and metallic aluminum.

In accordance with the invention, a process is provided for recovering soluble alkali metal aluminum tetrahydrides from aluminum hexahydrides by reaction with an oxygen ether. The formation of the tetrahydride is accompanied by liberation of alkali metal hydride, according to the equation:

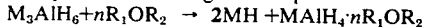
$$M_3AlH_6 + nR_1OR_2 \rightarrow 2MH + MAlH_4 \cdot nR_1OR_2$$

In the above formulas, M is an alkali metal, and $R_1$ and $R_2$ are organic radicals of the specific structure described below, corresponding to tetrahydrofuran or a methyl ether, and $n$ is 1 or 2. The oxygen ether appears to form an adduct with the tetrahydride, containing up to 2 moles of the oxygen ether to 1 mole of the tetrahydride.

This process has many advantages over the prior procedure. No metallic aluminum or gaseous hydrogen under superatmospheric pressure are required as a starting material. The reaction occurs under moderate conditions, even at room temperature (25° C.), without the use of hazardous materials such as aluminum alkyls. Moreover, alkali metal hydride is produced as a valuable byproduct. The process is easily adaptable to continuous operation.

The alkali metal tetrahydride is soluble in the organic ether, while the hexahydride and the single metal hydride byproduct are insoluble. This behavior permits the isolation of the soluble tetrahydride product from the reaction mixture.

The reaction proceeds at room temperature. It is frequently accompanied by an extended induction period, which may require as much as 3 hours or more, after which the reaction proceeds at an accelerated rate. Warming the reaction mixture to a temperature above room temperature will shorten the induction period, and increase the overall reaction rate. Consequently, it is generally preferred in a commercial process to carry out the reaction at a temperature within the range from about 25° C. up to the boiling point of the oxygen ether at atmospheric pressure. Higher reaction temperatures can be used, in the case of low-boiling oxygen ethers, by carrying out the reaction under a superatmospheric pressure appropriate to maintain the oxygen ether in the liquid phase in the course of the reaction. In general, it will be found convenient to reflux the reaction mixture at a suitable maximum temperature. In any case, the reaction temperature will be below the decomposition temperature for the desired products, the alkali metal aluminum tetrahydride and the alkali metal hydride. In view of these considerations, the reaction temperature does not usually exceed about 150° C.

The oxygen ethers that are employed in the process of the invention should be good solvents for the alkali metal aluminum tetrahydride, and nonsolvents for the alkali metal hydride. This makes it possible to separate the two reaction products at the conclusion of the reaction simply by filtration, or by centrifuging the alkali metal hydride, after which the alkali metal aluminum tetrahydride can be separated from the solution by distillation of the solvent at atmospheric or reduced pressure.

The oxygen ether should not contain protonic hydrogen, i.e., a labile hydrogen atom. Also, its boiling point should be such that the reaction can be carried to completion at a suitable reaction temperature at which the organic liquid remains in the liquid phase, either at atmospheric or at superatmospheric pressure.

The preferred ethers include tetrahydrofuran, and methyl ethers having the structure:

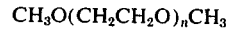
$$CH_3O(CH_2CH_2O)_nCH_3$$

$n$ is a number from 0 to 4. Exemplary methyl ethers include dimethyl ether, dimethoxyethane, dimethyl ether of diethylene glycol (diglyme), dimethyl ether of triethylene glycol and dimethyl ether of tetraethylene glycol.

The process is applicable to alkali metal aluminum hexahydrides as a class, including for instance, sodium aluminum hexahydride, lithium aluminum hexahydride, potassium aluminum hexahydride, cesium aluminum hexahydride, and rubidium aluminum hexahydride.

The oxygen ether can, if desired, be employed in an amount in excess of that required to form the 2 to 1 adduct with the alkali metal aluminum tetrahydride, so as to serve as a reaction solvent. If it is desired that the amount of ether present should be kept at a minimum, an inert solvent can be added, such as for instance, aromatic hydrocarbons, such as benzene, toluene, or the xylenes; aliphatic hydrocarbons, such as hexane, heptane or octane; thioethers, such a dimethyl sulfide and diethyl sulfide; and cycloaliphatic hydrocarbons, such as cycloheptane, cyclohexane, and cyclopentane.

It is important that oxygen and moisture be excluded from the reaction system, and consequently, it is usually preferable to carry out the reaction in a closed vessel under an inert atmosphere. If the system is closed, and the reaction is operated under reflux, an inert atmosphere may not be necessary, the reaction system being bathed in vapors of the oxygen ether and/or an inert diluent, if present.

The reaction time will be determined by the time required for the insoluble hexahydride to be transformed into the soluble tetrahydride. This is determined by reaching a constant concentration of soluble hydride. This will require from 30 minutes to as much as 2 days, depending on reaction temperature.

The insolubility of the alkali metal hydride and the solubility of the alkali metal aluminum tetrahydride in the organic ether and any inert diluent makes it possible at the conclusion of the reaction to separate the insoluble material from the remainder by filtration or by centrifuging. The filtrate is then concentrated by solvent distillation, under atmospheric or reduced pressure, so as to remove the unreacted organic ether and/or any inert diluent.

The following examples represent preferred embodiments of the invention.

EXAMPLE 1

The process of Peters (*Can. J. Chem.* 42 1755 (1964)) was employed to prepare bis-trimethylamine alkane $AlH_3 \cdot 2$ $N(CH_3)_2$ by reaction of $LiAlH_4$ and $N(CH_3)_2$. Lithium aluminum hexahydride was formed as a byproduct and precipitated, as it was insoluble in the reaction mixture. The white solid was isolated by filtration, washed thoroughly with hexane, with diethyl ether, and with benzene, to remove any materials soluble therein, and then stored in tetrahydrofuran at room temperature under argon. The solid material $Li_3AlH_6$, density 1.13, was heavier than the tetrahydrofuran, density 0.888, and consequently settled to the bottom of the flask. During storage after several hours time, a light solid material appeared, which floated on the tetrahydrofuran, while all of the heavy solid material at the bottom gradually reacted, and had entirely disappeared at the end of 24 hours, at which time reaction to form the soluble lithium aluminum tetrahydride was complete.

The reaction mixture then was filtered. The supernatant solid material that was removed was washed thoroughly with tetrahydrofuran, and then pumped in high vacuum at room temperature to remove traces of the tetrahydrofuran. X-ray analysis of the light solid material established it as pure lithium hydride.

The filtrate was analyzed for soluble hydride, lithium, and aluminum. The observed ratio Li:Al:H was 1.00:1.09:3.90, in close agreement with the theoretical value of 1:1:4 for $LiAlH_4$. Thus, the product was lithium aluminum tetrahydride.

EXAMPLE 2

A sample of 0.304 g. lithium aluminum hexahydride, $Li_3AlH_6$ (5.64 millimoles), prepared from lithium aluminum hydride and butyl lithium according to the procedure described by Ehrlich (reference cited earlier), was stirred with 13.14 g. tetrahydrofuran at room temperature. Samples of the reaction mixture were withdrawn at intervals, filtered, and the soluble hydride content determined by titration with 0.1 N solution of iodine in toluene. No reaction was noted until after an induction period of 3 hours, after which reaction began, and proceeded at an accelerated rate. The observed change in the conversion of $Li_3AlH_6$ to $LiAlH_4$ with time is shown in the table below.

TABLE I

Conversion of $Li_3AlH_6$ to $LiAlH_4$ in Tetrahydrofuran at Room Temperature

| Reaction Time, hours | % Conversion* of $Li_3AlH_6$ to $LiAlH_4$ |
|---|---|
| 0.0 | 0 |
| 3.3 | 6.64 |
| 4.0 | 15.95 |
| 4.7 | 39.40 |
| 26.5 | 84.40 |

*(Based on soluble hydride content.

The reaction was stopped after 26.5 hours, inasmuch as all of the starting solid material had disappeared in the tetrahydrofuran at the conclusion of this time, and reaction was therefore essentially complete.

EXAMPLE 3

A suspension of 0.71 g. $Li_3AlH_6$ was treated with 10 ml. of dimethoxyethane and stirred at room temperature overnight under argon. The reaction mixture was filtered, and the clear filtrate was analyzed for soluble lithium, aluminum and active hydride. The observed analytical results gave the atomic ratio Li:Al:H of 1.0:1.33:4.18, indicating that the soluble species was primarily $LiAlH_4$, which is soluble in dimethoxyethane. The supernatant solid material separated by filtration was LiH.

EXAMPLE 4

Example 3 is repeated, substituting the dimethyl ether of diethylene glycol for the dimethoxyethane. The product isolated is found to be $LiAlH_4$. The supernatant solid material which is filtered off is LiH.

EXAMPLE 5

Example 1 is repeated except that $Na_3AlH_6$ (prepared by the procedure of Ashly [reference cited]) is treated with tetrahydrofuran. The soluble product in tetrahydrofuran is $NaAlH_4$. The byproduct is insoluble sodium hydride.

Having regard to the foregoing disclosure, the following is claimed as the invention and patentable embodiment thereof:

1. A process for the recovery of soluble alkali metal hydrid values from insoluble alkali metal aluminum hexahydrides, consisting essentially of reacting the alkali metal hexahydride with an oxygen ether which does not contain a stabile hydrogen atom and which is selected from the group consisting of tetrahydrofuran and methyl ethers having the structure:

$$CH_3O(CH_2CH_2O)_nCH_3$$

in which $n$ is a number from 0 to 4 at a temperature at which reaction proceeds within the range from about 25 to about 150° C. to form a corresponding alkali metal aluminum tetrahydride and alkali metal hydride, separating the alkali metal hydride, and recovering the corresponding soluble tetrahydride.

2. A process in accordance with claim 1 in which the oxygen ether is tetrahydrofuran.

3. A process in accordance with claim 1, in which the oxygen ether is an aliphatic methyl ether having the formula $CH_3O(CH_2CH_2O)_nCH_3$ where $n$ is a number from 0 to 4.

4. A process in accordance with claim 3, in which the ether is a dimethyl ether of a polyoxyethylene glycol having from two to eight carbon atoms, and from two to five ether oxygen atoms.

5. A process in accordance with claim 1 in which the alkali metal is lithium.

6. A process in accordance with claim 1 in which the alkali metal is sodium.

7. A process in accordance with claim 1 in which the reaction with the hexahydride is carried out in suspension in an excess of the oxygen ether in which tetrahydride is soluble and the alkali metal hydride is insoluble.

8. A process in accordance with claim 1 in which the reaction is carried out in suspension in an inert diluent in which the tetrahydride is soluble and the alkali metal hydride is insoluble.

9. A process in accordance with claim 1 in which the reaction is carried out under reflux of the oxygen ether.

10. A process in accordance with claim 1 in which the tetrahydride after separation from the oxygen ether is washed with an inert diluent in which it is insoluble, and which is a solvent for the oxygen ether.

* * * * *